United States Patent
Kocherry et al.

(10) Patent No.: US 12,168,518 B2
(45) Date of Patent: Dec. 17, 2024

(54) HYBRID ECS ARCHITECTURE TO REDUCE ENGINE BLEED DEPENDENCY FOR AIRCRAFT CABIN PRESSURE AND TEMPERATURE CONTROL

(71) Applicant: Hamilton Sundstrand Corporation, Charlotte, NC (US)

(72) Inventors: John John Kocherry, Kerala (IN); Santosh Kumar Tripathy, Karnataka (IN); Tony Ho, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 941 days.

(21) Appl. No.: 16/674,839

(22) Filed: Nov. 5, 2019

(65) Prior Publication Data

US 2021/0070453 A1      Mar. 11, 2021

(30) Foreign Application Priority Data

Sep. 6, 2019   (IN) .............................. 201911035927

(51) Int. Cl.
| | | |
|---|---|---|
| B64D 13/06 | (2006.01) | |
| B64D 33/02 | (2006.01) | |
| F25B 9/00 | (2006.01) | |

(52) U.S. Cl.
CPC ............. *B64D 13/06* (2013.01); *B64D 33/02* (2013.01); *F25B 9/004* (2013.01);
(Continued)

(58) Field of Classification Search
CPC ................... B64D 13/06; B64D 33/02; B64D 2013/0611; B64D 2013/0618;
(Continued)

(56) References Cited

U.S. PATENT DOCUMENTS 5,461,882 A * 10/1995 Zywiak .................. B64D 13/06
                                                          62/401
5,899,085 A     5/1999 Williams
(Continued)

FOREIGN PATENT DOCUMENTS

| EP | 1112930 A2 | 7/2001 |
| EP | 1386837 A1 | 2/2004 |

(Continued)

OTHER PUBLICATIONS

EP1386837 mt (Year: 2004).*
(Continued)

*Primary Examiner* — Gordon A Jones
(74) *Attorney, Agent, or Firm* — CANTOR COLBURN LLP

(57) ABSTRACT

An environmental control system includes an ambient air conduit and a bleed air conduit, an electric compressor connected to the ambient air conduit and a mechanical compressor connected to the electric compressor. The electric compressor is supported for rotation independent of the mechanical compressor. A turbine is operatively connected to the mechanical compressor, the turbine connected to both the ambient air conduit and the bleed air conduit to provide conditioned air to a conditioned air conduit. Computer program products and methods of providing conditioned air to conditioned air loads are also described.

14 Claims, 6 Drawing Sheets

(52) U.S. Cl.
CPC ........... *B64D 2013/0611* (2013.01); *B64D 2013/0618* (2013.01); *B64D 2013/064* (2013.01); *B64D 2013/0644* (2013.01); *B64D 2033/0266* (2013.01)

(58) Field of Classification Search
CPC ...... B64D 2013/064; B64D 2013/0644; B64D 2033/0266; F25B 9/004
See application file for complete search history.

(56) References Cited

U.S. PATENT DOCUMENTS

| | | | | |
|---|---|---|---|---|
| 6,519,969 | B2 * | 2/2003 | Sauterleute | B64D 13/06 |
| | | | | 62/401 |
| 6,948,325 | B1 * | 9/2005 | Axe | B64D 13/06 |
| | | | | 62/402 |
| 9,656,756 | B2 | 5/2017 | Atkey | |
| 10,293,945 | B2 | 5/2019 | Hoffjann et al. | |
| 10,450,074 | B2 * | 10/2019 | Stieger | F01D 15/10 |
| 10,534,359 | B2 * | 1/2020 | Dong | G05B 23/0283 |
| 2008/0264084 | A1 * | 10/2008 | Derouineau | B64D 13/06 |
| | | | | 62/401 |
| 2016/0229542 | A1 * | 8/2016 | Bruno | B64D 13/08 |
| 2016/0355267 | A1 * | 12/2016 | Bruno | B64D 13/06 |
| 2017/0355466 | A1 | 12/2017 | Galzin et al. | |
| 2018/0134396 | A1 | 5/2018 | Blumer et al. | |
| 2018/0194481 | A1 | 7/2018 | Ludvik et al. | |

FOREIGN PATENT DOCUMENTS

| | | | |
|---|---|---|---|
| EP | 1860026 A2 | 11/2007 | |
| EP | 2845803 A1 | 3/2015 | |
| EP | 3098165 A2 * | 11/2016 | ............. B64D 13/04 |
| EP | 3235728 A1 * | 10/2017 | ............. B64D 13/02 |
| EP | 3401223 A1 | 11/2018 | |

OTHER PUBLICATIONS

European Search Report for Application No. 19212837.9, mailed Jul. 15, 2020, 8 pages.
European Office Action; European Application No. 19212837.9; Date: Aug. 5, 2022; 6 pages.
European Office Action; European Application No. 19212837.9; Date: Dec. 19, 2023; 4 pages.

* cited by examiner

HYBRID ECS ARCHITECTURE TO REDUCE ENGINE BLEED DEPENDENCY FOR AIRCRAFT CABIN PRESSURE AND TEMPERATURE CONTROL

CROSS-REFERENCE TO RELATED APPLICATIONS

This application claims the benefit of Indian Patent Application No. 201911035927 filed Sep. 6, 2019, the disclosure of which is incorporated herein by reference in its entirety.

BACKGROUND

The present disclosure relates generally to conditioning air using environmental control systems, and more particularly to conditioning air using either (or both) bleed air and ambient air provided to an environmental control system.

Vehicles, such as aircraft, commonly employ compressed air extracted from the vehicle engine for environmental control of spaces within the vehicle. The compressed air is typically extracted from the working fluid flow generated during operation of the vehicle engine, reducing efficiency of the vehicle engine according to the mass of bleed air extracted from the vehicle engine. With the advent of 'more electric' architectures it has become possible to provide air using electric components, such electric compressors, to provide compressed air for environmental control.

Such systems and methods have generally been satisfactory for their intended purpose. However, there remains a need for improved environmental control systems and methods of providing conditioned air to conditioned air loads.

BRIEF DESCRIPTION

An environmental control system (ECS) is provided. The ECS includes an ambient air conduit and a bleed air conduit, an electric compressor connected to the ambient air conduit, a mechanical compressor connected to the electric compressor, the electric compressor supported for rotation independent of the mechanical compressor, and a turbine. The turbine is operatively connected to the mechanical compressor, and the turbine connected to both the ambient air conduit and the bleed air conduit to provide conditioned air to a conditioned air conduit.

In addition to one or more of the features described above, or as an alternative, further embodiments of the ECS may include an electric compressor bypass valve connecting the ambient air conduit to the mechanical compressor.

In addition to one or more of the features described above, or as an alternative, further embodiments of the ECS may include an electric compressor isolation valve connecting the electric compressor to the mechanical compressor.

In addition to one or more of the features described above, or as an alternative, further embodiments of the ECS may include a bleed air valve connected by the bleed air conduit to the turbine.

In addition to one or more of the features described above, or as an alternative, further embodiments of the ECS may include a primary heat exchanger connecting the bleed air conduit to the turbine, a secondary heat exchanger connecting the mechanical compressor to the conditioned air conduit, and a heat exchanger interconnect valve connecting the secondary heat exchanger to the primary heat exchanger.

In addition to one or more of the features described above, or as an alternative, further embodiments of the ECS may include a heat exchanger interconnect valve connected to the mechanical compressor, and a re-heater/condenser/water separator subsystem connected to the mechanical compressor by the heat exchanger interconnect valve.

In addition to one or more of the features described above, or as an alternative, further embodiments of the ECS may include that the turbine is a first turbine and ECS additionally includes a second turbine with an inlet and an outlet operatively connected to the mechanical compressor, the outlet of the second turbine connected to the conditioned air conduit. A re-heater/condenser/water separator subsystem connects the first turbine to the inlet of the second turbine and a turbine interconnect valve interconnects the first turbine to the inlet of the second turbine through the re-heater/condenser/water separator subsystem.

In addition to one or more of the features described above, or as an alternative, further embodiments of the ECS may include that the turbine is a first turbine having an inlet and an outlet and that the ECS further includes a second turbine connecting the outlet of the first turbine with the conditioned air conduit. A second turbine bypass valve connects the outlet of the first turbine to the conditioned air conduit, the second turbine bypass valve is connected in parallel with the second turbine between the outlet of the first turbine and the conditioned air conduit.

In addition to one or more of the features described above, or as an alternative, further embodiments of the ECS may include an electric compressor drive shaft operably connecting an electric motor to the electric compressor and a mechanical compressor drive shaft operably connecting the turbine to the mechanical compressor.

In addition to one or more of the features described above, or as an alternative, further embodiments of the ECS may include a controller. The controller is operatively connected to the electric compressor and responsive to instructions recorded on a memory to select one of (a) an ambient air-only mode, (b) a single-compressor bleed air and ambient air mode, and (c) a dual-compressor bleed air and ambient air mode. The instructions further cause the controller to generate the conditioned air using the selected mode.

In addition to one or more of the features described above, or as an alternative, further embodiments of the ECS may include that the electric compressor is in fluid communication with the mechanical compressor in the ambient air-only mode.

In addition to one or more of the features described above, or as an alternative, further embodiments of the ECS may include that the electric compressor is fluidly separated from the mechanical compressor in the single-compressor bleed air and ambient air mode.

In addition to one or more of the features described above, or as an alternative, further embodiments of the ECS may include that the mechanical compressor and the bleed air conduit are configured and sized to have insufficient capacity during selected operating conditions of the ECS, and that the ambient air conduit is configured and sized to provide the additional capacity needed during the selected operating conditions.

A computer program product is also provided. The computer program product is recorded on a non-transitory machine-readable medium having instructions recorded on a medium that, when read by a processor, cause the processor to select one of (a) an ambient air-only mode, (b) a single-compressor bleed air and ambient air mode, and (c) a dual-compressor bleed air and ambient air mode. The instructions further cause an ECS as described above to generate conditioned air using the selected mode, the electric compressor in fluid communication with the mechanical compressor in the ambient air-only mode, the electric compressor is fluidly separated from the mechanical compressor in the single-compressor bleed air and ambient air mode, and the mechanical compressor is in fluid communication with the electric compressor in the dual-compressor bleed air and ambient air mode.

A method of providing conditioned air to a conditioned air load is also provided. The method includes, an ECS as described above; receiving at least one of a bleed air flow and an ambient air flow at the ECS; selecting one of (a) an ambient air-only mode, (b) a single-compressor bleed air and ambient air mode, and (c) a dual-compressor bleed air and ambient air mode; and generating conditioned air from the at least one of the bleed air flow and the ambient air flow in the selected mode.

In addition to one or more of the features described above, or as an alternative, further embodiments of the method may include fluidly separating the ambient air conduit from the mechanical compressor, and thereafter removing electric power from the electric compressor.

In addition to one or more of the features described above, or as an alternative, further embodiments of the method may include fluidly separating the bleed air conduit from the turbine and applying electric power to the electric compressor.

In addition to one or more of the features described above, or as an alternative, further embodiments of the method may include fluidly coupling the bleed air conduit to the turbine, fluidly coupling the ambient air conduit to the mechanical compressor, and fluidly separating the electric compressor from the mechanical compressor such that the ambient air flow traversing the mechanical compressor and bypassing the electric compressor.

In addition to one or more of the features described above, or as an alternative, further embodiments of the method may include fluidly coupling the bleed air conduit to the turbine, fluidly coupling the ambient air conduit to the mechanical compressor through the electric compressor, compressing the ambient air flow received at the bleed air conduit with the electric compressor, and further compressing the ambient air flow with the mechanical compressor.

Technical effects of the present disclosure include the capability to provide conditioned air using relatively small amounts of bleed air, improving engine efficiency. Technical effects of the present disclosure also allow the ECS devices described herein to be relatively lightweight due the employment of heat exchangers commensurate in size with the relatively small amounts of bleed air required to generate conditioned air for conditioned air loads. Technical effects of the present disclosure additionally allow ECS devices described herein to provide relatively high efficiency owing to the employment of electric compressors and reliability afforded by the employment of a mechanical compressor.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
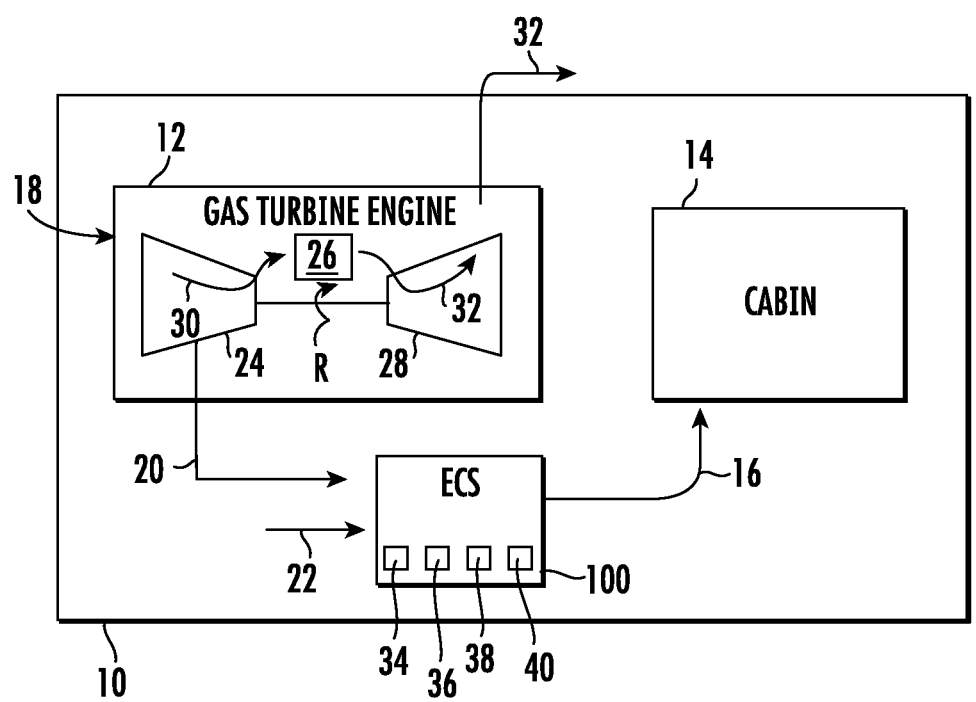
FIG. 1 is a schematic view of a vehicle with an environmental control system (ECS) constructed in accordance with the present disclosure, showing an ECS with (a) an ambient air-only mode, (b) a single-compressor bleed air and ambient air mode, and (c) a dual-compressor bleed air and ambient air mode providing conditioned air to a conditioned air load.

Reference will now be made to the drawings wherein like reference numerals identify similar structural features or aspects of the subject disclosure. For purposes of explanation and illustration, and not limitation, a partial view of an exemplary embodiment of an environmental control system (ECS) 100 constructed in accordance with the disclosure is shown in FIG. 1 and is designated generally by reference character 100. Other embodiments of environmental control systems, methods of providing conditioned air to conditioned air loads, and computer program products in accordance with the present disclosure, or aspects thereof, are provided in FIGS. 2-6, as will be described. The systems and methods described herein can be used for providing conditioned air using both electrical compression and mechanical compression of ambient air ingested from the external environment, such as wide body aircraft having 'more electric' architectures, though the present disclosure is not limited conditioning air using both electrical and mechanical compression or any particular aircraft electrical architecture in general.

With reference to FIG. 1, a vehicle 10, e.g., an aircraft, is shown. The vehicle 10 includes a gas turbine engine 12, a conditioned air load 14, and the ECS 100. The vehicle 10 carries the gas turbine engine 12, the conditioned air load 14, and the ECS 100. The ECS 100 connects the gas turbine engine 12 to the conditioned air load 14 and is configured to provide a flow of conditioned air 16 from either (or both) a bleed air flow 20 extracted from the gas turbine engine 12 and an ambient air flow 22 acquired directly from the external environment 18, as will be described. In certain embodiments the conditioned air load 14 includes a cabin, such as an aircraft cabin for crew and/or passengers by way of illustration and not for purposes of limitation.

The gas turbine engine 12 includes a compressor section 24, a combustor section 26, and a turbine section 28. The compressor section 24 is in fluid communication with the combustor section 26, is operatively associated with the turbine section 28, and is configured to compress air ingested from the external environment 18 to generate a working fluid flow 30. The working fluid flow 30 is communicated to the combustor section 26, which is in fluid communication with the turbine section 28, and which generates a flow of high-pressure combustion products 32 using the working fluid flow 30. The turbine section 28 receives the flow of high-pressure combustion products 32, expands and extracts work from the flow of high-pressure combustion products 32, and communicates a portion of the extracted work to the compressor section 24 as mechanical rotation R to compress the working fluid flow 30. The ECS 100 is connected to the compressor section 24 and is arranged to receive therefrom a portion of the working fluid flow 30 as the bleed air flow 20.

As will be appreciated by those of skill in art in view of the present disclosure, generating conditioned air using a bleed air flow, e.g., the bleed air flow 20 from the compressor section 24, can reduce the efficiency of the gas turbine engine providing the bleed air flow. As will also be appreciated by those of skill in the art in view of the present disclosure, bleed air may be unavailable in amounts sufficient to generate a desired flow of conditioned air during certain operating regimes of a gas turbine engine, e.g., when the gas turbine engine 12 supplying the ECS 100 is shut down and/or during engine starting. To limit the amount of the bleed air flow 20 extracted from compressor section 24 to generate the conditioned air 16 and/or enable the ECS 100 to provide the conditioned air 16 during intervals when the bleed air flow 20 is insufficient the ECS 100 includes both an electric compressor 110 (shown in FIG. 2) and a mechanical compressor 130 (shown in FIG. 2) operatively associated with a controller 114 (shown in FIG. 2) to provide the conditioned air 16 using (a) an ambient air-only mode 36, (b) a single-compressor bleed air and ambient air mode 38, and (c) a dual-compressor bleed air and ambient air mode 40, as will be described. It is contemplated that primary source of the conditioned air 16 be the electric compressor 110, supplemented as required by the bleed air flow 20 extracted from the compressor section 24.

Figure 2:
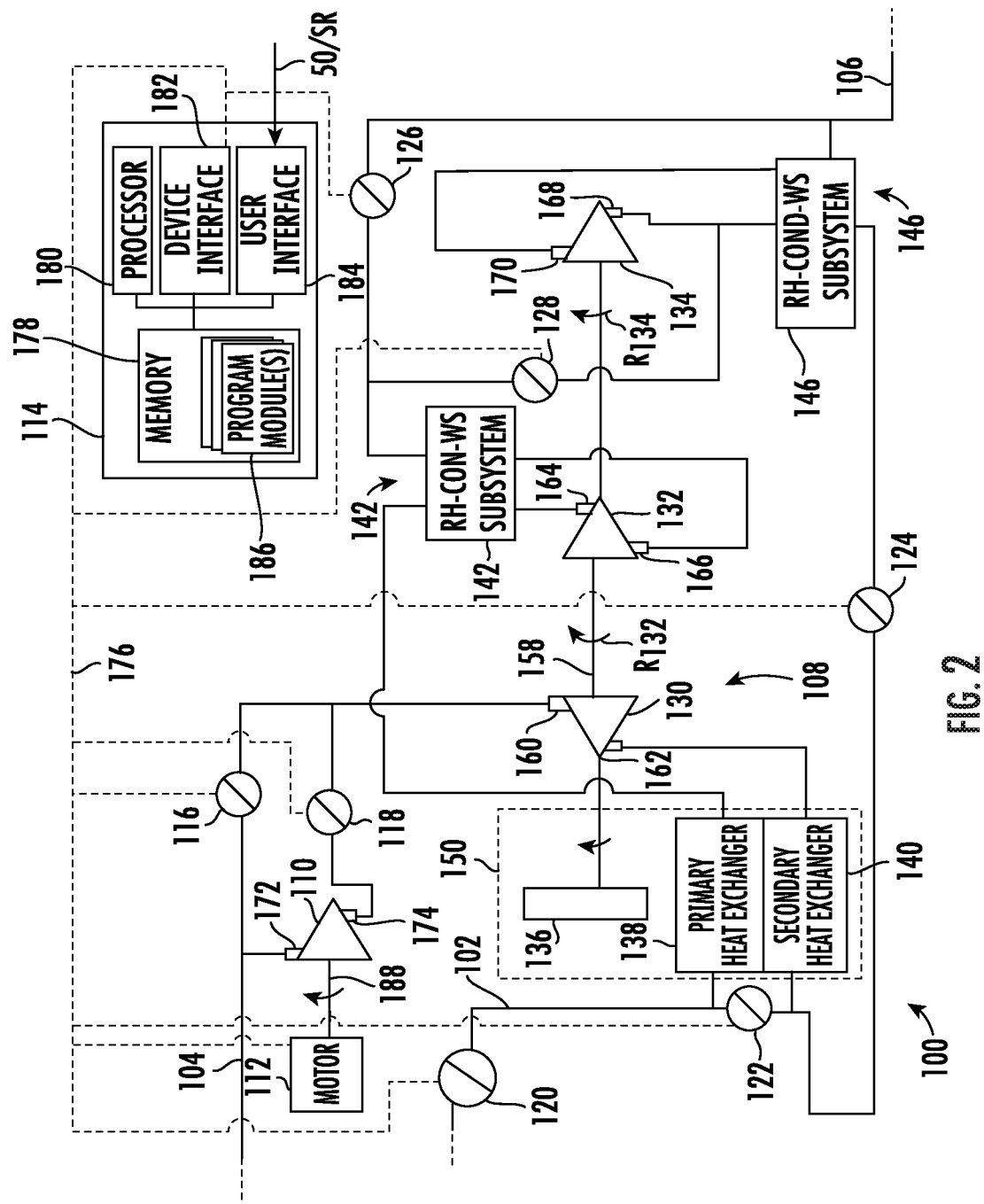
FIG. 2 is a schematic view of the ECS of FIG. 1, showing an electric compressor and a mechanical compressor of ECS connecting a bleed air conduit and an ambient air conduit to a conditioned air conduit through valves of the ECS.

Referring to FIG. 2, the ECS 100 is shown. The ECS 100 includes a bleed air conduit 102, an ambient air conduit 104, and a conditioned air conduit 106. The ECS 100 also includes an air cycle machine (ACM) 108 including the electric compressor 110, an electric motor 112, the mechanical compressor 130, and the controller 114. The ECS 100 also includes electric compressor bypass valve 116, an electric compressor isolation valve 118, a bleed air valve 120, and a heat exchanger (HEX) interconnect valve 122. The ACM additionally includes a first turbine bypass valve 124, a second turbine bypass valve 126, and a turbine interconnect valve 128.

The ACM 108 includes the mechanical compressor 130, a first turbine 132, a second turbine 134, and a fan 136. The ACM 108 also includes a primary heat exchanger 138 and a secondary heat exchanger 140. The ACM 108 additionally includes a first re-heater/condenser/water separator subsystem 142 and a second re-heater/condenser/water separator subsystem 146.

The first re-heater/condenser/water remover subsystem 142 includes a re-heater with a hot side and a cold side, a condenser with a hot side and a cold side, and a water separator. Fluid enters the hot side of the re-heater, traverses the hot side of the re-heater, and thereafter enters the hot side of the condenser. Once across the hot side of the condenser the fluid traverses the water remover, and therethrough to cold side of the re-heater. From the cold side of the re-heater the fluid flows through the first turbine 132, and thereafter returns to the cold side of the condenser of the first re-heater/condenser/water remover subsystem 142. The second re-heater/condenser/water remover subsystem 146 is similar to the first re-heater/condenser/water remover subsystem 142 with the difference that fluid entering the second re-heater/condenser/water remover subsystem 146 flows through the second turbine 134 prior to entering the cold side of the condenser of the second re-heater/condenser/water remover subsystem 146.

The fan 136, the primary heat exchanger 138, and the secondary heat exchanger 140 of the ECS 100 are each arranged within a duct 150. The fan 136 is supported for rotation and is operatively associated with the first turbine 132 and the second turbine 134. The fan 136 is also configured to drive air from the ambient environment across the primary heat exchanger 138 and the secondary heat exchanger 140 for exchanging heat between ambient air driven by the fan 136 through the duct 150 and fluids traversing the primary heat exchanger 138 and the secondary heat exchanger 140.

The primary heat exchanger 138 of the ECS 100 is connected to the bleed air valve 120 by the bleed air conduit 102. The primary heat exchanger 138 is also connected to the first turbine 132 through the first re-heater/condenser/water separator subsystem 142, and therethrough to the conditioned air conduit 106. In this respect the bleed air conduit 102 is connected to the first turbine 132 by the primary heat exchanger 138. The bleed air conduit 102 is also connected to the conditioned air conduit 106 serially by the heat exchanger interconnect valve 122 and the first turbine bypass valve 124.

The secondary heat exchanger 140 of the ECS 100 is connected to the mechanical compressor 130 and therethrough to the ambient air conduit 104. More specifically, the secondary heat exchanger 140 is connected to the ambient air conduit 104 through the electric compressor 110 and the electric compressor isolation valve 118. The secondary heat exchanger 140 is also connected to the ambient air conduit 104 through the electric compressor bypass valve 116, which is connected in parallel with electric compressor 110 and the electric compressor isolation valve 118, between ambient air conduit 104 and the mechanical compressor 130.

The mechanical compressor 130 of the ECS 100 is operably associated with the first turbine 132 and the second turbine 134, e.g., via a mechanical compressor drive shaft 158, and has an inlet 160 and an outlet 162. The inlet 160 of the mechanical compressor 130 is connected to the ambient air conduit 104. The outlet 162 of the mechanical compressor 130 is connected to the conditioned air conduit 106 through the second re-heater/condenser/water separator subsystem 146 and the second turbine 134.

The first turbine 132 of the ECS 100 is operably connected to the mechanical compressor 130 through the mechanical compressor drive shaft 158, has an inlet 164 and an outlet 166, and is configured to extract work from fluid traversing the first turbine 132 for application to the mechanical compressor 130 through the mechanical compressor drive shaft 158 as mechanical rotation $R_{132}$. The inlet 164 of the first turbine 132 is connected to the primary heat exchanger 138 through the first re-heater/condenser/water remover subsystem 142. The outlet 166 of the first turbine 132 is connected through the first re-heater/condenser/water separator subsystem 142 to the conditioned air conduit 106. Further, the outlet 166 of the first turbine 132 is connected to the conditioned air conduit 106 through both the turbine interconnect valve 128 and the second turbine 134 and the second turbine bypass valve 126, which are connected in parallel with one another between the first re-heater/condenser/water separator subsystem 142 and the conditioned air conduit 106.

The second turbine 134 of the ECS 100 is operably connected to the mechanical compressor 130 through the mechanical compressor drive shaft 158, has an inlet 168 and an outlet 170, and is configured to extract work from fluid traversing the second turbine 134. The extracted work is applied to the mechanical compressor 130 and the fan 136 as mechanical rotation $R_{134}$ to compress fluid traversing the mechanical compressor 130 and drive fluid through the duct 150, i.e. across the primary heat exchanger 138 and the secondary heat exchanger 140. The inlet 168 of the second turbine 134 is connected to the outlet 166 of the first turbine 132 through the turbine interconnect valve 128. The inlet 168 of the second turbine 134 is also connected to the mechanical compressor 130 through, the second re-heater/condenser/water separator subsystem 146, the first turbine bypass valve 124, and the secondary heat exchanger 140. The outlet 170 of the second turbine 134 is connected to the conditioned air conduit 106 through the second re-heater/condenser/water separator subsystem 146.

The electric compressor 110 of the ECS 100 is operatively associated with the electric motor 112 by an electric compressor drive shaft 188, has an inlet 172 and an outlet 174, and is configured to compress fluid traversing the electric compressor 110 using mechanical rotation $R_{112}$ provided by the electric motor 112. The inlet 172 of the electric compressor 110 is connected to the ambient air conduit 104 and is in fluid communication therethrough with the external environment 18 to receive therethrough ambient air at ambient air pressure. The outlet 174 of the electric compressor 110 is connected to the inlet 160 of the mechanical compressor 130 through the electric compressor isolation valve 118. As the electric motor 112 is connected to the electric compressor 110 by the electric compressor drive shaft 188, the electric compressor drive shaft 188 is independent (i.e. rotationally free) relative to the mechanical compressor drive shaft 158.

Figure 3:
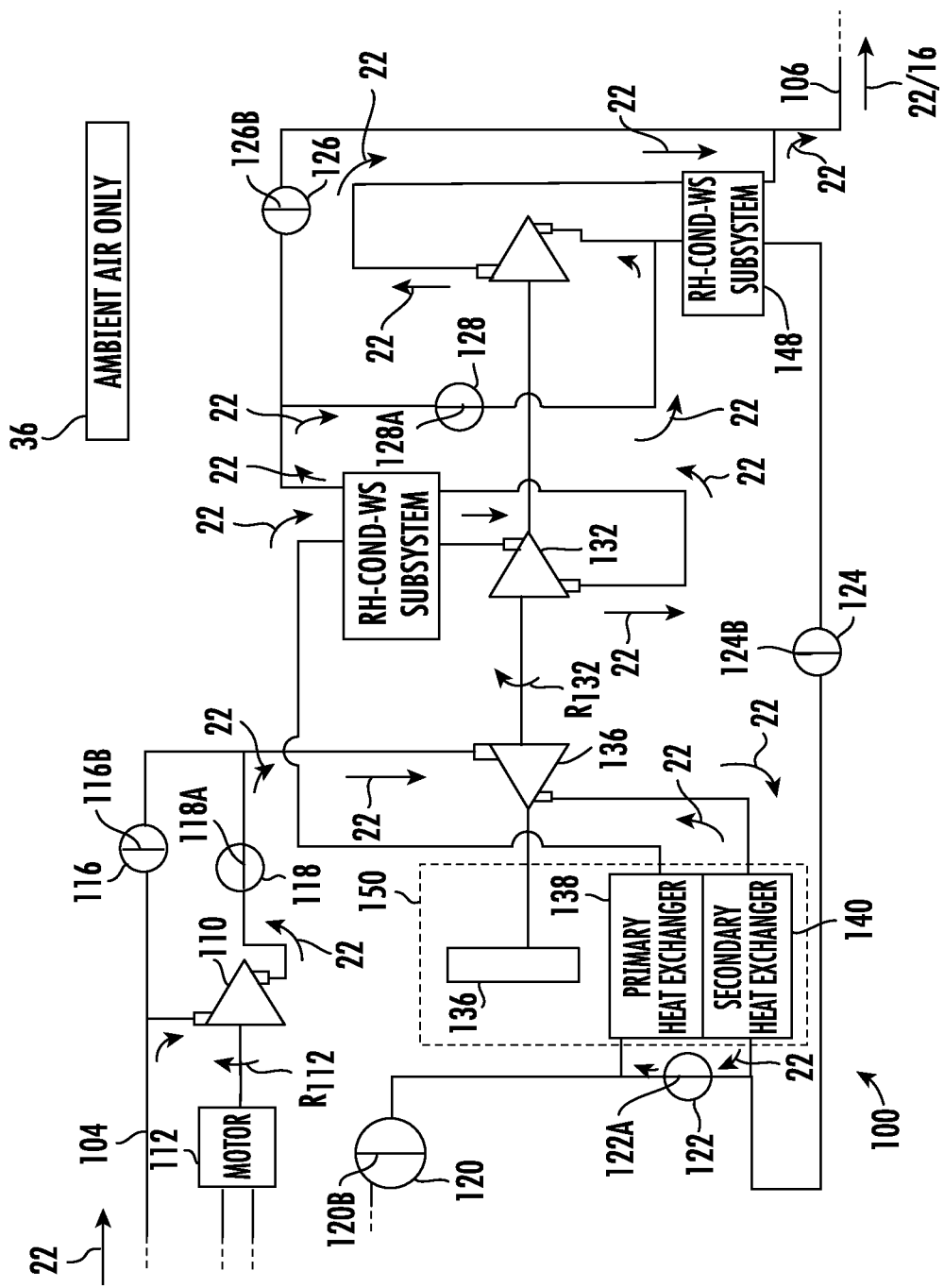
FIG. 3 is a schematic view of the ECS of FIG. 1, showing the ECS providing conditioned air to the conditioned air conduit using only an ambient air flow in the ambient air-only mode.

The electric compressor bypass valve 116 of the ECS 100 connects the ambient air conduit 104 to the mechanical compressor 130 and has an open position 116A (shown in FIG. 4) and a closed position 116B (shown in FIG. 3). In the closed position 116B the electric compressor bypass valve 116 fluidly separates the ambient air conduit 104 from the mechanical compressor 130. In the open position 116A the electric compressor bypass valve 116 fluidly couples the ambient air conduit 104 with the inlet 160 of the mechanical compressor 130, the ambient air conduit 104 thereby in fluid communication with the inlet 160 of the mechanical compressor 130 to communicate the ambient air flow 22 at ambient pressure to the mechanical compressor 130.

Figure 6:
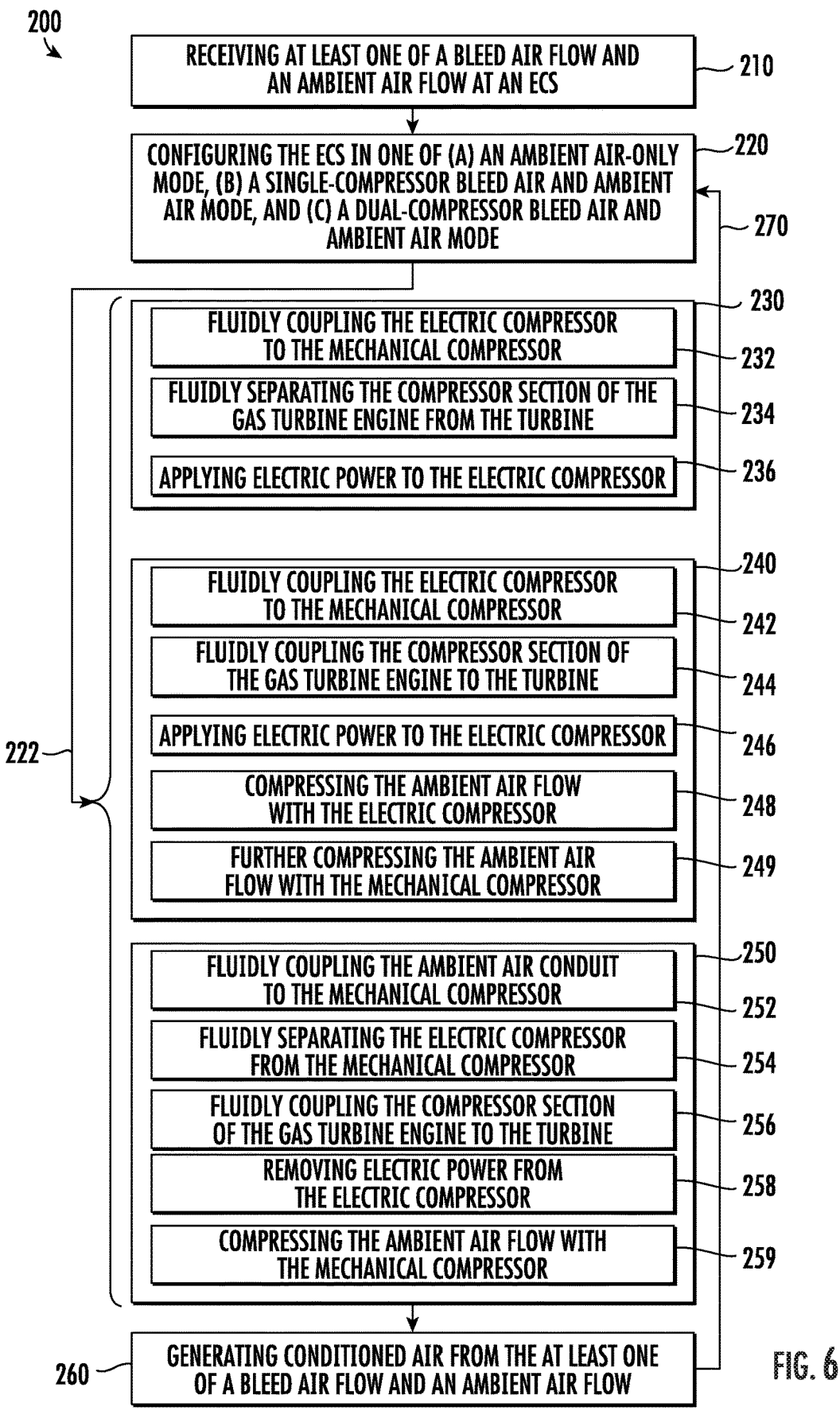
FIG. 6 is a block diagram of a method of generating conditioned air for a conditioned air load, showing steps of the method according to an illustrative and non-limiting embodiment of the method.

The electric compressor isolation valve 118 of the ECS 100 connects the electric compressor 110 to the mechanical compressor 130 and has an open position 118A (shown in FIG. 4) and a closed position 118B (shown in FIG. 6). In the closed position 118B the electric compressor isolation valve 118 fluidly separates the electric compressor 110 from the mechanical compressor 130. In the open position 118A the electric compressor isolation valve 118 fluidly couples the electric compressor 110 with the inlet 160 of the mechanical compressor 130, the electric compressor 110 thereby in fluid communication with the inlet 160 of the mechanical compressor 130. In certain embodiments the electric compressor isolation valve 118 can be a throttle valve arranged to modulate fluid flow from the electric compressor 110 to the inlet of the mechanical compressor 130 to communicate the ambient air flow 22, as compressed by the electric compressor 110, to the mechanical compressor 130.

The bleed air valve 120 of the ECS 100 connects the compressor section 24 (shown in FIG. 1) of the gas turbine engine 12 (shown in FIG. 1) with the bleed air conduit 102 and has an open position 120A (shown in FIG. 2) and a closed position 120B (shown in FIG. 3). In the closed position 120B the bleed air valve fluidly separates the compressor section 24 from the bleed air conduit 102. In the open position 120A the bleed air valve 120 fluidly couples the compressor section 24 with the bleed air conduit 102, the compressor section 24 thereby in fluid communication with the bleed air conduit 102 to communicate the bleed air flow 20 to the bleed air conduit 102.

Figure 4:
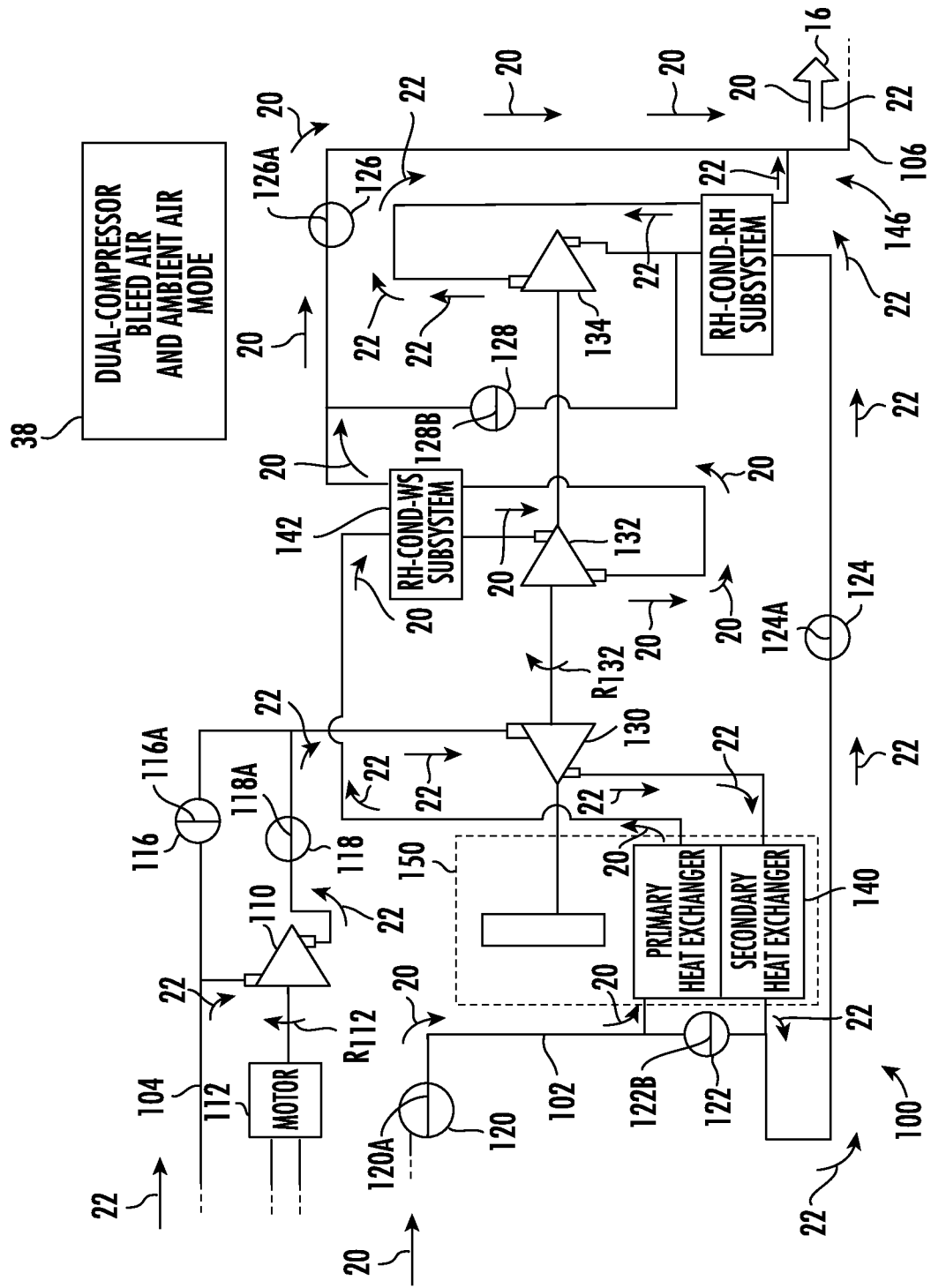
FIG. 4 is a schematic view of the ECS of FIG. 1, showing the ECS providing conditioned air to the conditioned air conduit using a bleed air flow and an ambient air flow in the dual-compressor bleed air and ambient air mode.
Figure 5:
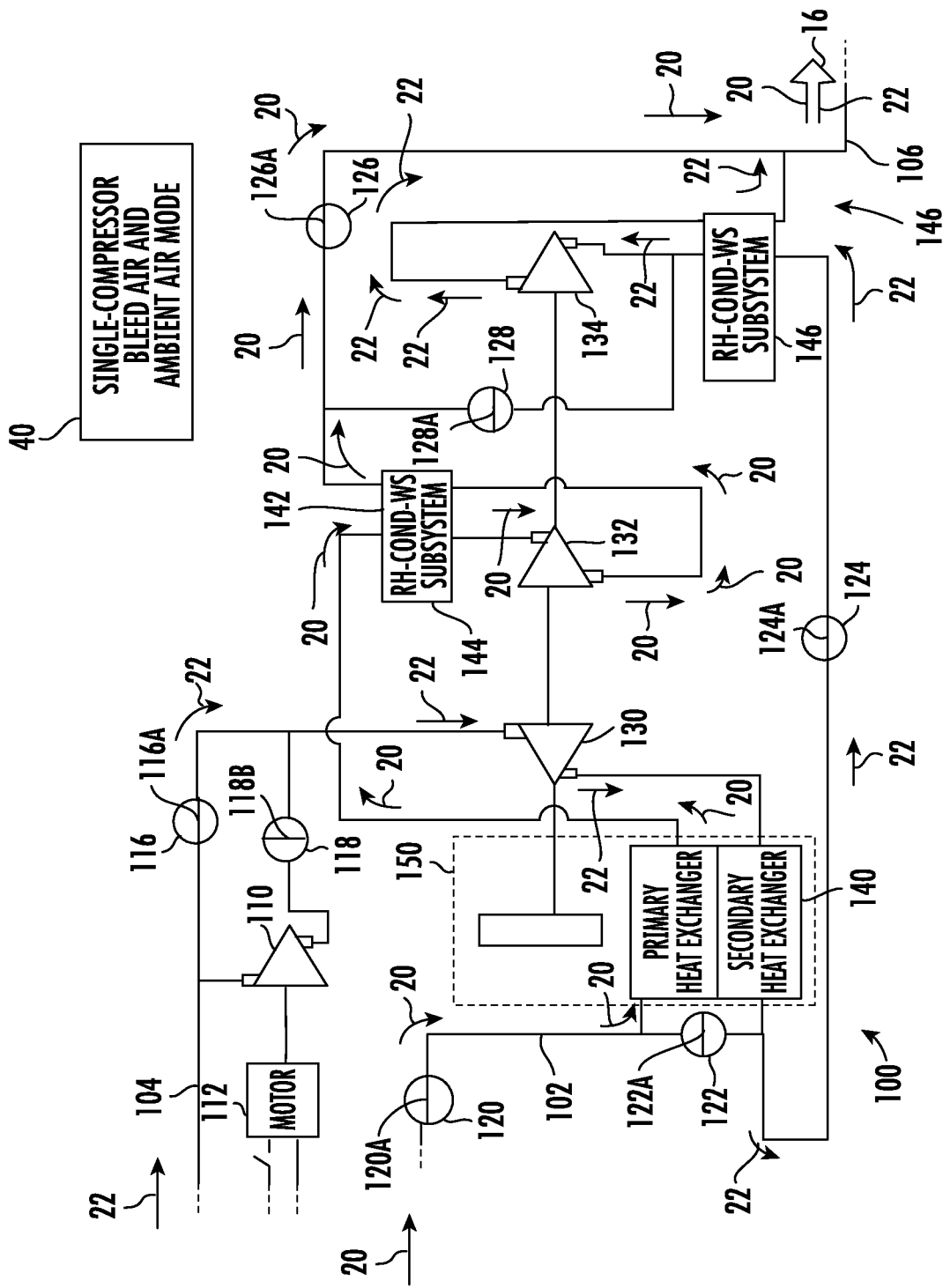
FIG. 5 is a schematic view of the ECS of FIG. 1, showing the ECS providing conditioned air to the conditioned air conduit using a bleed air flow and an ambient air flow in the single-compressor bleed air and ambient air mode.

The heat exchanger interconnect valve 122 of the ECS 100 connects the primary heat exchanger 138 with the secondary heat exchanger 140 and has an open position 122A (shown in FIG. 4) and a closed position 122B (shown in FIG. 5). In the closed position 122B the heat exchanger interconnect valve 122 fluidly separates the primary heat exchanger 138 from the secondary heat exchanger 140. In the open position 122A the heat exchanger interconnect valve 122 fluidly couples the secondary heat exchanger 140 with the primary heat exchanger 138 to receive the bleed air flow 20 and/or the ambient air flow 22, the secondary heat exchanger 140 thereby in fluid communication with the primary heat exchanger 138 to communicate only the ambient air flow 22 through both the secondary heat exchanger 140 and the primary heat exchanger 138.

The first turbine bypass valve 124 of the ECS 100 connects the secondary heat exchanger 140 with the second re-heater/condenser/water separator subsystem 146 and has an open position 124A (shown in FIG. 5) and a closed position 124B (shown in FIG. 3). In the closed position 124B the first turbine bypass valve 124 fluidly separates the secondary heat exchanger 140 from the second re-heater/condenser/water separator subsystem 146. In the open position 124A the first turbine bypass valve 124 fluidly couples the secondary heat exchanger 140 with the second re-heater/condenser/water separator subsystem 146, the secondary heat exchanger 140 thereby in fluid communication with the second re-heater/condenser/water separator subsystem 146 to communicate the ambient air flow 22 to the second turbine 134 therethrough.

The turbine interconnect valve 128 of the ECS 100 connects the first re-heater/condenser/water separator subsystem 142 to the second turbine 134 and has an open position 128A (shown in FIG. 3) and a closed position 128B (shown in FIG. 4). In the closed position 128B the turbine interconnect valve 128 fluidly separates the first re-heater/condenser/water separator subsystem 142 from the second turbine 134. In the open position 128A the turbine interconnect valve 128 fluidly couples the first re-heater/condenser/water separator subsystem 142 with the second turbine 134, the first re-heater/condenser/water separator subsystem 142 in fluid communication with the second turbine 134 to communicate the ambient air flow 22 to the second turbine 134.

The second turbine bypass valve 126 of the ECS 100 connects the first re-heater/condenser/water separator subsystem 142 to the conditioned air conduit 106 and has an open position 126A (shown in FIG. 4) and a closed position 126B (shown in FIG. 3). In the closed position 126B the second turbine bypass valve 126 fluidly separates the first re-heater/condenser/water separator subsystem 142 from the conditioned air conduit 106. In the open position 126A the second turbine bypass valve 126 fluidly couples the first re-heater/condenser/water separator subsystem 142 with the conditioned air conduit 106, the first re-heater/condenser/water separator subsystem 142 in fluid communication with the conditioned air conduit 106 to communicate the bleed air flow 20 to the conditioned air conduit 106.

The controller 114 of the ECS 100 is disposed in communication with the electric motor 112 and the valves of the ECS 100, e.g., the electric compressor bypass valve 116, the electric compressor isolation valve 118, the bleed air valve 120, the heat exchanger interconnect valve 122, the first turbine bypass valve 124, the second turbine bypass valve 126, and the turbine interconnect valve 128, through a link 176 and is operatively connected therethrough to the electric motor 112 and the valves of the ECS 100. As shown in FIG. 2 the controller 114 includes a memory 178, a processor 180, a device interface 182, and a user interface 184. The processor 180 is operatively connected to the user interface 184, is disposed in communication with the link 176 through the device interface 182 and is further disposed in communication with the memory 178.

The memory 178 includes a non-transitory machine-readable medium having a plurality of program modules 186, e.g., a computer program product. The plurality of program modules 186 are recorded on the memory 178, and contain instructions that, when read by the processor 180, cause the processor 180 to undertake operations a method 200 (shown in FIG. 6) for controlling flow through an ECS, e.g., the ECS 100, as will be described. Among those operations are operations to switch the ECS 100 between (a) an ambient air-only mode 36 (shown in FIG. 3), (b) a dual-compressor bleed air and ambient air mode 38 (shown in FIG. 4), and (c) a single-compressor bleed air and ambient air mode 40 (shown in FIG. 5) to provide the conditioned air 16 to the conditioned air load 14 (shown in FIG. 1) according a selection 50 received at the controller 114, e.g., at the user interface 184. Although a specific architecture of the controller 114 is shown in FIG. 2 it is to be understood and appreciated that the controller 114 can be implemented using software, circuitry, or both software and circuitry, as suitable for an intended application.

In certain embodiments of the mechanical compressor 130 and the bleed air conduit 102 are configured and sized to have insufficient capacity during selected operating conditions of the ECS 100. In such embodiments the ambient air conduit 104 is configured and sized to provide additional capacity needed during the selected operating conditions to provide sufficient conditioned air to the condition load conduit 106. Examples of such selected operating conditions include the dual-compressor bleed air and ambient air mode 26 (shown in FIG. 4) and the single-compressor bleed air and ambient air mode 40 (shown in FIG. 5).

With reference to FIG. 3, the ECS 100 is shown providing the conditioned air 16 to the conditioned air load 14 (shown in FIG. 1) in the ambient air-only mode 36. To operate in the ambient air-only mode 36 the controller 114 (shown in FIG. 2) opens and closes selected valves such that the conditioned air 16 is generated using only the ambient air flow 22. In this respect the electric compressor bypass valve 116 is moved to the closed position 116B, the electric compressor isolation valve 118 is moved to the open position 118A, the heat exchanger interconnect valve 122 is moved to the open position 122A, and the first turbine bypass valve 124 is moved to the closed position 124B. Additionally, the turbine interconnect valve 128 is moved to the open position 128A, the bleed air valve 120 is moved to the closed position 120B, and the second turbine bypass valve 126 is moved to the closed position 126B.

With the valves in these positions the controller 114 (shown in FIG. 2) applies power to the electric motor 112 such that the ambient air flow 22 entering the ECS 100 through the ambient air conduit 104 is compressed by the electric compressor 110. The compressed ambient air flow 22 flows through the electric compressor isolation valve 118 to the mechanical compressor 130, which further compresses the ambient air flow 22, and communicates the further compressed ambient air flow 22 to the secondary heat exchanger 140. The secondary heat exchanger 140 transfers heat between the expanded ambient air flow 22 and air driven through the duct 150 by the fan 136 and provides the expanded ambient air flow 22 to the primary heat exchanger 138 through the heat exchanger interconnect valve 122, the primary heat exchanger 138 transferring additional heat between the expanded ambient air flow 22 and the air driven through the duct 150 by the fan 136.

The primary heat exchanger 138 communicates the further compressed ambient air flow 22 to the first turbine 132 through the first re-heater/condenser/water separator subsystem 142. The first turbine 132 extracts work from the ambient air flow 22 to power the mechanical compressor 130 and the fan 136 and communicates the expanded ambient air flow 22 to the second turbine 134 through the first re-heater/condenser/water separator subsystem 142 and the turbine interconnect valve 128. The second turbine 134 in turn extracts further work from the expanded ambient air flow 22 to power the mechanical compressor 130 and the fan 136 and provides the ambient air flow to the conditioned air conduit 106 through the second re-heater/condenser/water separator subsystem 146 as the conditioned air 16.

With reference to FIG. 4, the ECS 100 is shown operating in the dual-compressor bleed air and ambient air mode 38. To operate in the dual-compressor bleed air and ambient air mode 38 the controller 114 (shown in FIG. 2) opens and closes selected valves such that the conditioned air 16 is generated using both the bleed air flow 20 and the ambient air flow 22, and both the electric compressor 110 and the mechanical compressor 130. In this respect the controller 114 drives the electric compressor bypass valve 116 to the closed position 116B, the electric compressor isolation valve 118 to the open position 118A, the heat exchanger interconnect valve 122 to the closed position 122B, and the first turbine bypass valve 124 to the open position 124A. The controller 114 also drives the second turbine bypass valve 126 to the open position 126A and the turbine interconnect valve 128 to the closed position 128B, and additionally applies power from the electric motor 112.

Opening the bleed air valve 120 fluidly couples the compressor section 24 (shown in FIG. 1) of the gas turbine engine 12 (shown in FIG. 1) with the ECS 100, allowing communication of the bleed air flow 20 to the primary heat exchanger 138 and the heat exchanger interconnect valve 122. Closing the heat exchanger interconnect valve 122 fluidly separates the primary heat exchanger 138 from the secondary heat exchanger 140, the bleed air flow 20 thereby fluidly separated from the secondary heat exchanger 140. Opening the first turbine bypass valve 124 fluidly couples the secondary heat exchanger 140 to the second re-heater/condenser/water separator subsystem 146, allowing fluid communication of the ambient bleed flow from the secondary heat exchanger 140 to the second re-heater/condenser/water separator subsystem 146. Opening the second turbine bypass valve 126 and closing the turbine interconnect valve 128 fluidly couples the conditioned air conduit 106 with the second re-heater/condenser/water separator subsystem 146 while fluidly separating the second re-heater/condenser/water separator subsystem 146 from the second turbine 134.

Closing the electric compressor bypass valve 116 and opening the electric compressor isolation valve 118 fluidly couples the ambient air conduit 104 with the mechanical compressor 130 through the electric compressor 110. This communicates the ambient air flow 22 to the mechanical compressor 130 through electric compressor 110, the mechanical compressor 130 thereby compressing the ambient air flow 22 according to the power applied to the electric motor 112. As a consequence, the mass flow rate of the bleed air flow 20 can be reduced, limiting the efficiency loss associated with extracting the bleed air flow 20 from the compressor section 24 (shown in FIG. 1) of the gas turbine engine 12 (shown in FIG. 1).

As shown in FIG. 4, the fluid communication established by the illustrated valve positions causes both the bleed air flow 20 and the ambient air flow 22 to flow through the ECS 100 and join one another at the conditioned air conduit 106 to form the conditioned air 16. Specifically, the bleed air flow 20 traverses the bleed air valve 120, flows through the bleed air conduit 102, and thereafter traverses the primary heat exchanger 138. From the primary heat exchanger 138 the bleed air flow 20 flows through the first re-heater/condenser/water separator subsystem 142 to the first turbine 132, and thereafter through the second turbine bypass valve 126 to the conditioned air conduit 106. Notably, the mass flow rate of the bleed air flow 20 can relatively small due the compression provided by the electric compressor 110.

The ambient air flow 22 in turn flows through the ambient air conduit 104 and the electric compressor 110 to the mechanical compressor 130, undergoing compression in the mechanical compressor 130. The compressed ambient air flow 22 thereafter traverses the secondary heat exchanger 140, is cooled, and thereafter flows through the first turbine bypass valve 124 to the second re-heater/condenser/water separator subsystem 146. From the second re-heater/condenser/water separator subsystem 146 the ambient air flow 22 flows to the second turbine 134, undergoing drying and expansion in the second re-heater/condenser/water remover subsystem 146 and the second turbine 134, respectively, and thereafter joins the bleed air flow 20 in the conditioned air conduit 106 for provision to the conditioned air load 14 (shown in FIG. 1) as the conditioned air 16.

With reference to FIG. 5, the ECS 100 is shown operating in the single-compressor bleed air and ambient air mode 40. To operate in the single-compressor bleed air and ambient air mode 40 the controller 114 (shown in FIG. 2) opens and closes selected valves such that the conditioned air 16 is generated using both the bleed air flow 20 and the ambient air flow 22 using only the mechanical compressor 130. In this respect the controller 114 drives the electric compressor bypass valve 116 to the open position 116A, the electric compressor isolation valve 118 to the closed position 118B, the heat exchanger interconnect valve 122 to the closed position 122B, and the first turbine bypass valve 124 to the open position 124A. Additionally, the controller 114 also drives the second turbine bypass valve 126 to the open position 126A and the turbine interconnect valve 128 to the closed position 128B, and power is removed from the electric motor 112.

Opening the electric compressor bypass valve 116 and the closing the electric compressor isolation valve 118 fluidly couples the ambient air conduit 104 with the mechanical compressor 130. This allows fluid communication of the ambient air flow 22 through electric compressor bypass valve 116 to the mechanical compressor 130. Opening the bleed air valve 120 fluidly couples the compressor section 24 (shown in FIG. 1) of the gas turbine engine 12 (shown in FIG. 1) with the ECS 100, allowing communication of the bleed air flow 20 to the primary heat exchanger 138 and the heat exchanger interconnect valve 122. Closure of the heat exchanger interconnect valve 122 fluidly separates the primary heat exchanger 138 from the secondary heat exchanger 140, the bleed air flow 27 thereby fluidly separated from the secondary heat exchanger 140. Opening the first turbine bypass valve 124 fluidly couples the secondary heat exchanger 140 to the second re-heater/condenser/water separator subsystem 146, allowing fluid communication of the ambient bleed flow from the secondary heat exchanger 140 to the second re-heater/condenser/water separator subsystem 146. Opening the second turbine bypass valve 126 and closing the turbine interconnect valve 128 in turn fluidly couples the conditioned air conduit 106 with the second re-heater/condenser/water separator subsystem 146 while fluidly separating the second re-heater/condenser/water separator subsystem 146 from the second turbine 134.

As shown in FIG. 5, the fluid communication established by the illustrated valve positions causes both the bleed air flow 20 and the ambient air flow 22 to flow through the ECS 100 and join one another at the conditioned air conduit 106 to for the conditioned air 16. Specifically, the bleed air flow 20 traverses the bleed air valve 120, flows through the bleed air conduit 102, and traverses the primary heat exchanger 138. From the primary heat exchanger 138 the bleed air flow 20 flows through the first re-heater/condenser/water separator subsystem 142 to the first turbine 132, and therefrom through the second turbine bypass valve 126 to the conditioned air conduit 106.

The ambient air flow 22 in turn flows through the ambient air conduit 104 and electric compressor bypass valve 116 to the mechanical compressor 130, bypassing the electric compressor 110 and undergoing compression in the mechanical compressor 130. The compressed ambient air flow 22 thereafter traverses the secondary heat exchanger 140, is cooled, and thereafter flows through the first turbine bypass valve 124 to the second re-heater/condenser/water separator subsystem 146. From the condenser of the second re-heater/condenser/water separator subsystem 146 the ambient air flow 22 flows through the re-heater/condenser/water remover subsystem 146 and the second turbine 134, undergoing drying and expansion in the re-heater/condenser/water remover subsystem and the second turbine 134, respectively, and thereafter joins the bleed air flow 20 in the conditioned air conduit 106 for provision to the conditioned air load 14 (shown in FIG. 1) as the conditioned air 16. Notably, the conditioned air 16 is generated using both the bleed air flow 20 and the ambient air flow 22 without operation of the electric compressor 110 (shown in FIG. 2), the conditioned air 16 provided to the conditioned air load 14 during intervals when the electric compressor 110 is unavailable, e.g., when power is not available for the operation of the electric compressor 110.

With reference to FIG. 6, a method 200 of providing conditioned air to a conditioned air load, the conditioned air 16 (shown in FIG. 1) to the conditioned air load 14 (shown in FIG. 1), is shown. The method 200 includes receiving at least one of a bleed air flow and an ambient air flow at an ECS, e.g., the bleed air flow 20 (shown in FIG. 1) and an ambient air flow 22 (shown in FIG. 1) at the ECS 100 (shown in FIG. 1), as shown with box 210. As shown with box 220, the method 200 also includes configuring the ECS to one of (a) an ambient air-only mode, (b) a dual-compressor bleed air and ambient air mode, and (c) a single-compressor bleed air and ambient air mode. As shown with arrow 222 and bracket 224, configuring the ECS can include selecting from among the configurations according to efficiency requirement, availability (or unavailability) of bleed air, and/or availability (or unavailability) of electric power.

Operations for configuring the ECS for the ambient air-only mode are shown in box 230. Configuring the ECS for the ambient air-only mode includes fluidly coupling the electric compressor to the mechanical compressor, as shown with box 232. Configuring the ECS for the ambient air-only mode also includes fluidly separating the compressor section of the gas turbine engine from the turbine, as shown with box 234. Electric power is then applied to the electric compressor, as shown with box 236, and conditioned air formed from ambient air only is communicated to the conditioned air load, as shown with box 260.

Operations for configuring the ECS for dual-compressor bleed air and ambient air mode are shown in box 240. Configuring the ECS for the dual-compressor bleed air and ambient air mode fluidly includes fluidly coupling the electric compressor to the mechanical compressor, as shown with box 242. Configuring the ECS for dual-compressor bleed air and ambient air mode also includes fluidly coupling the compressor section of the gas turbine engine to the turbine, as shown with box 244. Electric power is provided to the electric compressor, as shown with box 246, the ambient air flow compressed with the electric compressor, as shown with box 248, and the ambient air flow further compressed with the mechanical compressor, as shown with box 249. The ambient air flow and the bleed air flow are communicated to the conditioned air load as the conditioned air, as shown with box 260.

Operations for configuring the ECS for the single-compressor bleed air and ambient air mode are shown in box 250. Configuring the ECS for the single-compressor bleed air and ambient air mode includes fluidly coupling the ambient air conduit to the mechanical compressor, as shown with box 252. Configuring the ECS for single-compressor bleed air and ambient air mode also includes fluidly coupling the compressor section of the gas turbine engine to the turbine, as shown with box 254. The electric compressor is fluidly separated from the mechanical compressor, as shown with box 256, electric power removed from the electric compressor, as shown with box 258, and the ambient air flow is compressed using the mechanical compressor, as shown with box 259. The bleed air flow and the ambient air flow are intermixed with one another within the ECS to generate the conditioned air, and the conditioned air communicated to the conditioned air load, as shown with box 260.

As shown with the arrow 270, it is contemplated that the configuration of the ECS be reconfigured as required to continue generating the conditioned according to operational considerations. For example, if the gas turbine engine shuts down the ECS can be re-configured for operation in the ambient air-only mode. Alternatively, in the event of an interruption of electric power to the ECS, the ECS can be reconfigured for operation in the single-compressor bleed air and ambient mode. This provides redundancy for generation of the conditioned air communicated to the conditioned air load.

The term "about" is intended to include the degree of error associated with measurement of the quantity based upon the equipment available at the time of filing the application.

The terminology used herein is for the purpose of describing embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a situation or material to the teachings of the present disclosure without departing from the essential scope thereof. Therefore, it is intended that the present disclosure not be limited to the embodiment disclosed as the best mode contemplated for carrying out this present disclosure, but that the present disclosure will include all embodiments falling within the scope of the claims.

What is claimed is:

1. An environmental control system, comprising:
   an ambient air conduit and a bleed air conduit;
   an electric compressor connected to the ambient air conduit;
   a mechanical compressor connected to an outlet of the electric compressor and to the ambient air conduit, the electric compressor supported for rotation independent of the mechanical compressor;
   a turbine operatively connected to the mechanical compressor, the turbine connected to both the ambient air conduit and the bleed air conduit to provide conditioned air to a conditioned air conduit;
   a primary heat exchanger connecting the bleed air conduit to the turbine;
   a secondary heat exchanger connecting the mechanical compressor to the conditioned air conduit; and
   a heat exchanger interconnect valve operable to fluidly couple an outlet of the secondary heat exchanger directly to an inlet of the primary heat exchanger, the secondary heat exchanger being arranged upstream from and in series with the primary heat exchanger relative to an ambient air flow.

2. The environmental control system of claim 1, further comprising an electric compressor bypass valve connecting the ambient air conduit to the mechanical compressor.

3. The environmental control system of claim 1, further comprising an electric compressor isolation valve connecting the electric compressor to the mechanical compressor.

4. The environmental control system of claim 1, further comprising a bleed air valve connected by the bleed air conduit to the turbine.

5. The environmental control system of claim 1, further comprising:
   a heat exchanger interconnect valve connected to the mechanical compressor; and
   a re-heater/condenser/water separator subsystem connected to the mechanical compressor by the heat exchanger interconnect valve.

6. The environmental control system of claim 1, wherein the turbine is a first turbine and further comprising:
   a second turbine with an inlet and an outlet operatively connected to the mechanical compressor, the outlet of the second turbine connected to the conditioned air conduit;
   a re-heater/condenser/water separator subsystem connecting the first turbine to the inlet of the second turbine; and
   a turbine interconnect valve interconnecting the first turbine to the inlet of the second turbine through the re-heater/condenser/water separator subsystem.

7. The environmental control system of claim 1, wherein the turbine is a first turbine having an inlet and an outlet, the environmental control system further comprising:
- a second turbine connecting the outlet of the first turbine with the conditioned air conduit; and
- a second turbine bypass valve connecting the outlet of the first turbine to the conditioned air conduit, wherein the second turbine bypass valve is connected in parallel with the second turbine between the outlet of the first turbine and the conditioned air conduit.

8. The environmental control system of claim 1, further comprising:
- an electric compressor drive shaft operably connecting an electric motor to the electric compressor; and
- a mechanical compressor drive shaft operably connecting the turbine to the mechanical compressor.

9. The environmental control system of claim 1, wherein the ambient air conduit is configured and sized to provide the additional capacity needed during a selected operating conditions.

10. The environmental control system of claim 1, further comprising a controller operatively connected to the electric compressor and responsive to instructions recorded on a memory to:
- select one of (a) an ambient air-only mode, (b) a single-compressor bleed air and ambient air mode, and (c) a dual-compressor bleed air and ambient air mode; and
- generate the conditioned air using the selected mode.

11. The environmental control system of claim 10, wherein the electric compressor is in fluid communication with the mechanical compressor in the ambient air-only mode.

12. The environmental control system of claim 10, wherein the electric compressor is fluidly separated from the mechanical compressor in the single-compressor bleed air and ambient air mode.

13. The environmental control system of claim 10, wherein the mechanical compressor is in fluid communication with the electric compressor in the dual-compressor bleed air and ambient air mode.

14. A computer program product recorded on a non-transitory machine-readable medium having instructions recorded on a medium that, when read by a processor, cause the processor to:
- select one of (a) an ambient air-only mode, (b) a single-compressor bleed air and ambient air mode, and (c) a dual-compressor bleed air and ambient air mode; and
- generate conditioned air using an environmental control system (ECS) as recited in claim 1 using the selected mode, wherein the electric compressor is in fluid communication with the mechanical compressor in the ambient air-only mode, wherein the electric compressor is fluidly separated from the mechanical compressor in the single-compressor bleed air and ambient air mode, and wherein the mechanical compressor is in fluid communication with the electric compressor in the dual-compressor bleed air and ambient air mode.

* * * * *